United States Patent [19]

Ogasawara

[11] Patent Number: 5,001,928
[45] Date of Patent: Mar. 26, 1991

[54] LIQUID LEVEL DETECTING APPARATUS

[75] Inventor: Kazuyoshi Ogasawara, Susono, Japan
[73] Assignee: Yazaki Corporation, Tokyo, Japan
[21] Appl. No.: 575,704
[22] Filed: Aug. 31, 1990

[30] Foreign Application Priority Data

Sep. 1, 1989 [JP] Japan ............................ 1-101801[U]

[51] Int. Cl.$^5$ ............................................. G01F 23/24
[52] U.S. Cl. .................................. 73/304 R; 340/620;
338/38; 338/80
[58] Field of Search ............. 73/304 R, 295; 340/620;
338/13, 38, 44, 80, 222

[56] References Cited

U.S. PATENT DOCUMENTS 4,641,523  2/1987  Andreasson .......................... 338/33

FOREIGN PATENT DOCUMENTS 2455198  11/1974  Fed. Rep. of Germany .... 73/304 R
15415    1/1987   Japan ................................ 73/304 R
1199124  8/1987   Japan ................................ 73/295
107116   4/1989   Japan ................................ 23/295
8405699  3/1984   United Kingdom ............ 73/304 R Primary Examiner—William A. Cuchlinski, Jr.
Assistant Examiner—G. Bradley Bennett
Attorney, Agent, or Firm—Armstrong, Nikaido, Marmelstein, Kubovcik & Murray

[57] ABSTRACT

A level detecting resistor (Rd) is inserted into a liquid (5) and has a length immersed in the liquid. The level detecting resistor (Rd) is supplied a constant current (Id) from a constant current source (1). The voltage drop (Vd) developed across the level detecting resistor (Rd) is supplied to a non-inverting input terminal of a differential input amplifier (OP1, R1-R4). The output (Vo) of the differential input amplifier is then divided by a series-circuit of a temperature compensating resistor (Rc) and a resistor (R5). The divided voltage (Va) across the resistor (R5) is fed back via a voltage follower (OP2) to the non-inverting input terminal of the differential input amplifier.

3 Claims, 2 Drawing Sheets

LIQUID LEVEL-DETECTING APPARATUS

BACKGROUND OF THE INVENTION

1. Field of the Invention

The present invention relates to a liquid level detecting apparatus for detecting the level or height of a liquid, and more particularly to a liquid level detecting apparatus in which a liquid level detecting resistor is placed in the liquid and the resistance of the detecting resistor varies in accordance with its length of immersed portion in the liquid.

2. Prior Art

As shown in FIG. 3, both a level detecting resistor Rd and a temperature compensating resistor of a conventional liquid level detecting apparatus take the form of a wire wound resistor that is wound around an elongated supporting member 3 or 8. The level detecting resistor Rd is placed vertically in the liquid as shown in FIG. 4 and is supplied a constant current Id from a constant current source 1. Likewise, the temperature compensating resistor Rc is inserted into the liquid as shown in FIG. 4. FIG. 2 shows a conventional liquid level detecting apparatus of this type. The voltage drop developed across the level detecting resistor Rd is supplied to an inverting input terminal (−) of an OP amplifier OP3 via the temperature compensating resistor Rc. The output of the OP amplifier OP3 is fed back to the inverting input terminal (−) thereof via a feedback resistor R6. In other words, the resistors Rc, R6, and the amplifier OP3 form a negative feedback amplifier whose gain is given by R6/Rc.

The resistors Rd and Rc have the following temperature characteristics.

$$Rd = Rdt(1 + \alpha d \Delta T)L \quad (1)$$

$$Rc = Rct(1 + \alpha c \Delta T)L \quad (2)$$

where Rdt and Rct are resistances per unit length of the level detecting resistor and temperature compensating resistor, respectively, at a certain ambient air temperature, for example, t=20° C. Rd and Rc are the overall resistances of the level detecting resistor and temperature compensating resistor, respectively, when the ambient air temperature increases by an increment $\Delta T$ from t° C. $\alpha d$ and $\alpha c$ are the temperature coefficients of resistances of the level detecting resistor Rd and temperature compensating resistor Rc, respectively, at the ambient air temperature t° C. L is the overall length of the respective resistors.

When the constant current Id flows through the detecting resistor Rd, the current Id generates an amount of heat to further increase the resistance of Rd at the temperature t° C. This heat is radiated to the liquid from a portion immersed in the liquid, causing the overall resistance to decrease somewhat. Thus, it is understood that the overall resistance of the level detecting resistor Rd at the ambient temperature t° C. varies with the length immersed in the liquid. In other words, the voltage developed across the level detecting resistor Rd represents the liquid level.

If $\alpha d = \alpha c = \alpha$ and both the level detecting resistor and temperature compensating resistor are inserted into the liquid, Eq. (1) and Eq. (2) are rewritten as follows:

$$Rd = Rdt(1 + \alpha \Delta T)\left(\frac{X}{1 - aK} + \frac{L - X}{1 - K}\right) \quad (3)$$

$$Rc = Rct(1 + \alpha \Delta T)\left(\frac{X}{1 - aK} + \frac{L - X}{1 - K}\right) \quad (4)$$

where X is a length of each resistor immersed in the liquid. a is a constant specific to the liquid. K is a quantity given by $K = I^2 R \alpha o \theta$, that is determined by the temperature coefficient $\alpha o$ ($\alpha d$ or $\alpha c$), the current I (Id or Ic) through the resistor R (Rd or Rc), and the thermal resistance $\theta$ in radiating heat generated therein to atmosphere... LS1 Therefore, $$\begin{aligned} Vd &= Id\, Rd \\ &= Id\, Rdt(1 + \alpha \Delta T)\left(\frac{X}{1 - aK} + \frac{L - X}{1 - K}\right) \end{aligned} \quad (5)$$

Thus, the output voltage Vout of the OP amplifier OP3 is given as follows:

$$\begin{aligned} Vout &= -Vd \frac{R6}{Rc} \\ &= -Id \frac{Rd\, R6}{Rc} \\ &= -Id \frac{Rdt(1 + \alpha \Delta T)\left(\frac{X}{1 - aK} + \frac{L - X}{1 - K}\right) R6}{Rct(1 + \alpha \Delta T)\left(\frac{X}{1 - aK} + \frac{L - X}{1 - K}\right)} \end{aligned}$$

If Id >> Ic, then the overall resistance of the temperature compensating resistor Rc does not vary with the length immersed in the liquid, thus $$Vout = -Id \frac{Rdt\, R6}{Rct\, L}\left(\frac{X}{1 - aK} + \frac{L - X}{1 - K}\right) \quad (6)$$

Rdt and Rct are the resistances per unit length of the level detecting resistor Rd and the temperature compensating resistor Rc at a specific ambient air temperature, for example, t=20° C., and therefore are fixed values. Now, Vout changes with the length X immersed in the liquid, not being affected by the change $\Delta T$ in the ambient temperature.

With this prior art apparatus, since a relatively large current Id is run through the level detecting resistor Rd for higher sensitivity, the voltage developed thereacross is relatively high. As a result, the high voltage across the level detecting resistor Rd tends to cause a current to flow through the temperature compensating resistor Rc, the current through Rc generates an amount of heat which in turn causes the resistance of Rc to vary. The change in resistance of Rc due to self-generated heat will result in deviation from the designed temperature versus resistance curve of the level detecting apparatus. To prevent this kind of measurement error, generally the temperature compensating resistor Rc is selected to be a large value so to as to maintain as low a current through Rc as possible. A large value of Rc requires more turns of wire and/or smaller diameters of the wire, which causes more complicated manufacture process. If Rd and Rc differ in diameter of the wire, they differ in temperture coefficient α. This causes a problem in temperature compensation of the level detecting resistor. Excess turns of wire that are wound around the supporting member tend to increase heat capacity of the resistor Rc, which takes a longer time for the resistance to settle when the ambient temperature changes, causing error in temperature compensation. In addition, the level detecting apparatus cannot follow a rapid change in liquid level.

SUMMARY OF THE INVENTION

An object of the invention is to provide a liquid level detecting apparatus in which the voltage developed across the liquid level detecting resistor is not affected by succeeding circuits or circuit elements to indicate correct liquid level.

Another object of the invention is to provide a liquid level detecting apparatus in which the correct liquid level is indicated without being affected by ambient temperatures.

A level detecting resistor is inserted into a liquid and has a length immersed in the liquid. The level detecting resistor is supplied a constant current from a constant current source. The voltage drop developed across the level detecting resistor is supplied to a differential type non-inverting amplifying circuit. The output of the non-inverting amplifying circuit is then divided by a series-circuit of a temperature compensating resistor and a resistor. The divided voltage is fed back via a voltage follower circuit to the non-inverting input terminal of the differential input amplifying circuit. The output voltage of the voltage follower circuit is free from the change of ambient temperature, thus the apparatus is temperature compensated.

BRIEF DESCRIPTION OF THE DRAWINGS

Features and other objects of the invention will be more apparent from the description of the preferred embodiments with reference to the accompanying drawings in which.

DESCRIPTION OF THE PREFERRED EMBODIMENTS

The present invention will now be described in detail with reference to the drawings.

Figure 1:
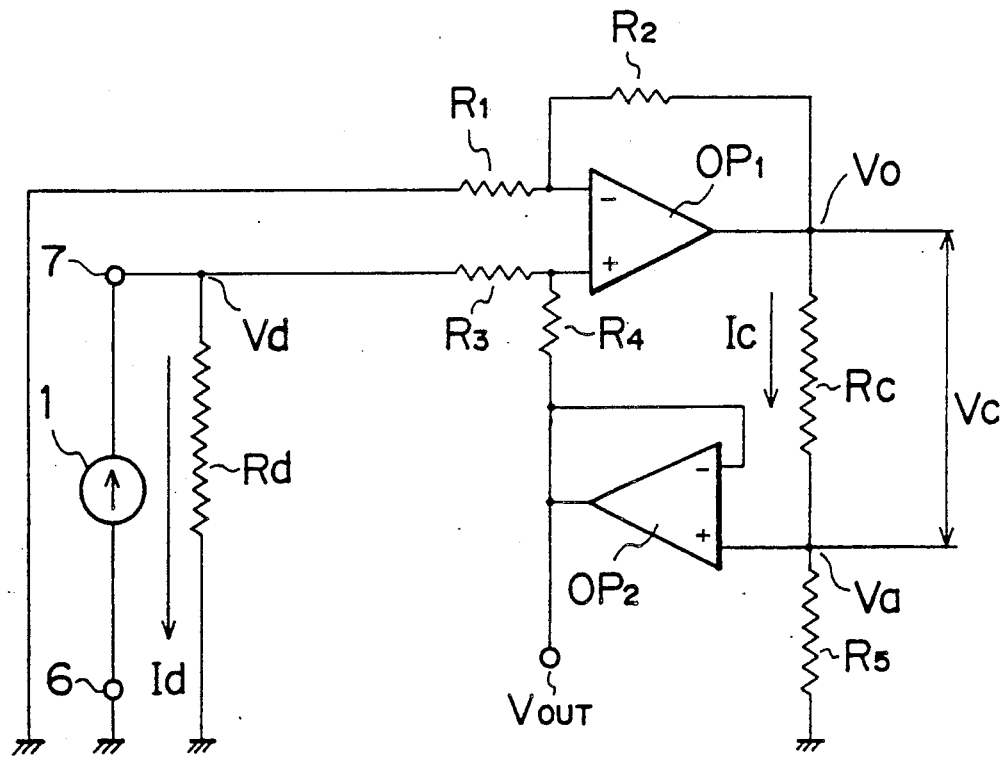
FIG. 1 is a circuit diagram showing a liquid level detecting apparatus according to the present invention.
Figure 2:
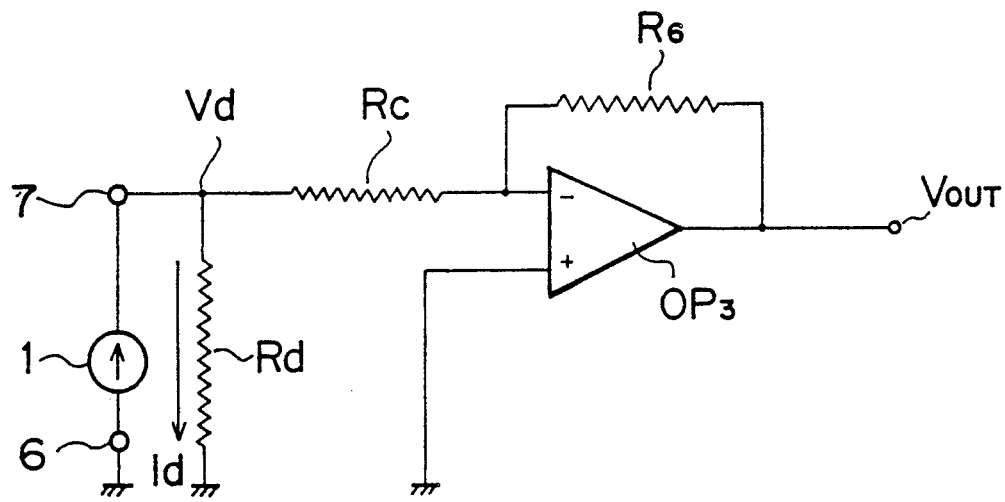
FIG. 2 shows a prior art liquid level detecting apparatus.
Figure 4:
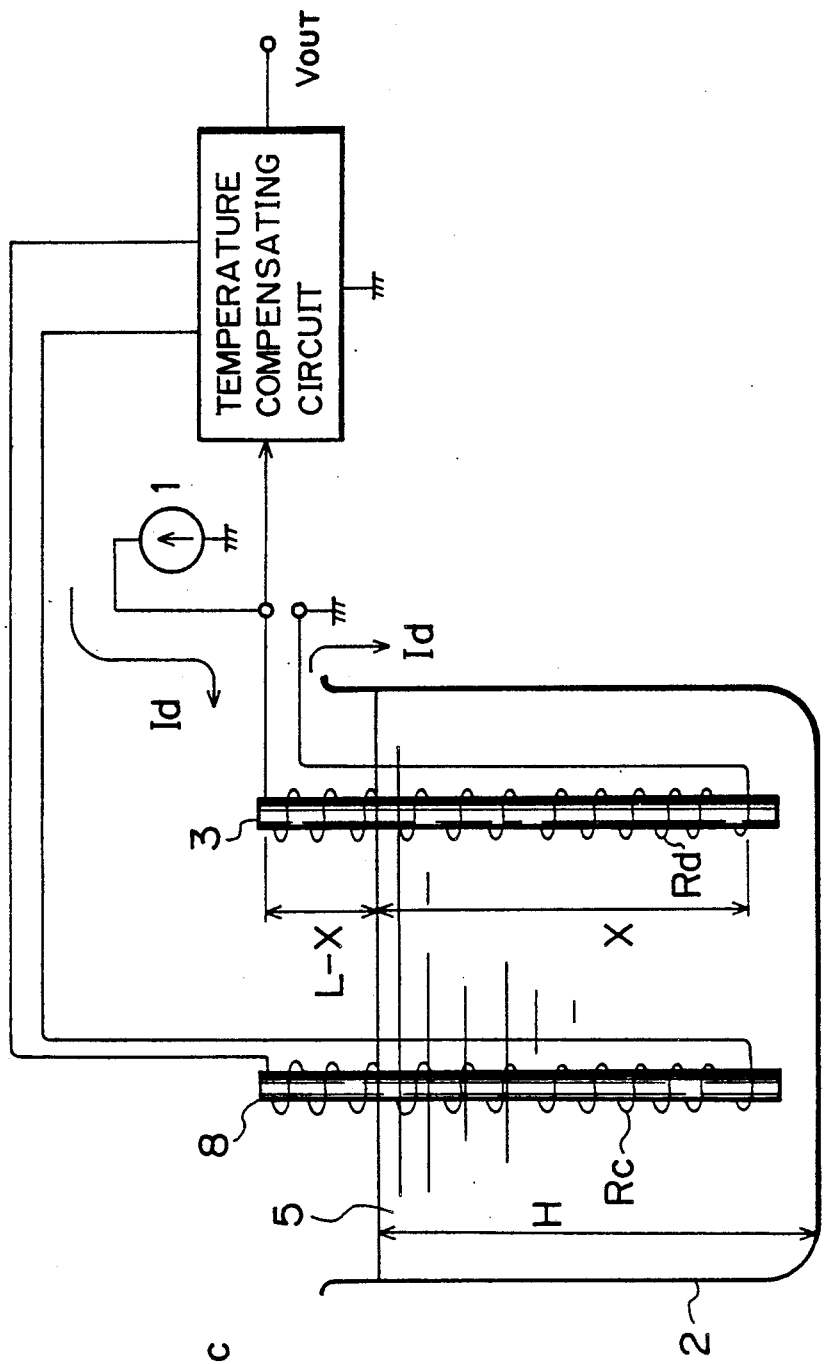
FIG. 4 is the liquid level detecting resistor and the temperature compensating resistor of the invention which are immersed in a liquid.
Figure 3:
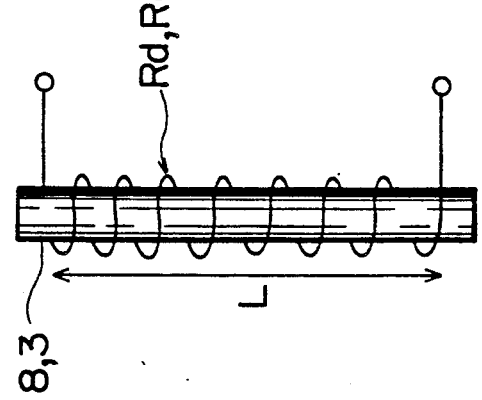
FIG. 3 is a perspective view of an assembly of the liquid level detecting resistor and the temperature compensating resistor of the invention.

FIG. 3 is a perspective view of assemblies 3 and 8 of a level detecting resistor Rd and a temperature compensating resistor Rd, respectively, of the present invention and FIG. 4 shows the level detecting resistor Rd and the temperature compensating resistor Rc immersed in the liquid 5 contained in a tank 2 so as to measure a liquid level H. FIG. 1 is a circuit diagram showing an embodiment of a liquid level detecting apparatus according to the present invention. A constant current source 1 supplies a constant current Id to the level detecting resistor Rd. The current Id causes a voltage drop Vd across the resistor Rd. The voltage Vd is applied to a non-inverting input terminal (+) of an OP amplifier OP1 via a resistor R3. Between the inverting input terminal (−) of the OP amplifier OP1 and the output terminal thereof is inserted a feedback resistor R2. The inverting input terminal (−) is grounded through a resistor R1. The output voltage Vout of the OP amplifier OP1 is divided by a series circuit of a resistor R5 and a temperature compensating resistor Rc. The voltage drop Va developed across the resistor R5 is supplied to the non-inverting input terminal (+) of an OP amplifier OP2. The OP amplifier OP2 is a voltage-follower where the signal is directly fed back from output to input and the output voltage thereof is of the same amplitude as the input voltage thereto. The output of the voltage follower is fed to the non-inverting input terminal (+) of the OP amplifier OP1 via a resistor R4. The output voltage of the voltage follower or OP amplifier OP2 represents the level of the liquid 5. It should be noted that the resistors R1–R4 and the OP amplifier OP1 form a differential input amplifier as a non-inverting amplifier.

When the constant current Id flows through the level detecting resistor Rd, the resistance of Rd varies due to the heat generated by the current Id. The heat is given off to the liquid to decrease somewhat. Thus, the resistance of the Rd varies with the length immersed in the liquid. The level detecting resistor Rd and the temperature compensating resistor Rc have the same value of temperature coefficient. The values of the various resistors in the circuit in FIG. 1 are selected to satisfy the following relations.

$$R1 = R3 \tag{8a}$$

$$R2 = R4 \tag{8b}$$

$$R1 : R2 = R1 : Rc \tag{8c}$$

therefore, $$R2\ R5 = R1\ Rc$$

$$R4\ R5 = R1\ Rc$$

The output voltage Vo of the OP amplifier OP1 is $$Vo = \frac{R1 + R2}{R1} \cdot \frac{R4}{R1 + R4} Vd + \frac{R1 + R2}{R1} \cdot \frac{R3}{R3 + R4} Va \tag{9}$$

putting Eqs. (8)a and (8)b into Eq. (9), $$Vo = \frac{R4}{R1} Vd + Va \tag{10}$$

thus, the voltage across the temperature compensating resistor Rc is $$\begin{aligned} Vc &= Vo - Va \\ &= \frac{R4}{R1} Vd + Va - Va \end{aligned} \tag{11}$$

thus, $$Vc = \frac{R4}{R1} Vd$$

thus, the current Ic through the resistor Rc is $$Ic = \frac{Vc}{Rc} = \frac{R4}{R1\,Rc} Vd \quad (12)$$

The output voltage Vout of the OP amplifier OP2 is $$Vout = Ic\,R5 \quad (13)a$$
$$= \frac{R4\,R5}{R1\,Rc} Vd \quad (13)b$$

From Eqs. (2) and (5), Eq. (12) can be rewritten as follows:

$$Ic = \frac{R4\,Id\,Rdt(1 + \alpha\Delta T)\left(\frac{X}{1-aK} + \frac{L-X}{1-K}\right)}{R1\,Rct(1+\alpha\Delta T)L} \quad (14)$$
$$= \frac{R4\,Rdt}{R1\,Rct\,L} Id\left(\frac{X}{1-aK} + \frac{L-X}{1-K}\right)$$
$$= \frac{R4\,Rdt}{R1\,Rc} Id\left(\frac{X}{1-aK} + \frac{L-X}{1-K}\right)$$

It should be noted that if R1>>R2 (=R4) and Rdt is nearly equal to Rct, then Ic<<Id. For example, R1 may be about 50 times larger than R2. This indicates that the resistor Rc generates much less amount of heat as compared to the resistor Rd.

The resistors R1, R4, and R5 are selected such that their temperature coefficients are much smaller, e.g., 1/100 or so, than those of the level detecting resistor Rd and the temperature compensating resistor Rc. It should be noted that RctL is the total resistance of the temperature compensating resistor Rc at a specific ambient temperature t, e.g., t=20° C. Therefore, RctL is a known fixed value. putting Eq. (14) into Eq. (13)a, $$Vout = Ic\,R5$$
$$= \frac{R4\,R5\,Rdt}{R1\,RctL} Id\left(\frac{X}{1-aK} + \frac{L-X}{1-K}\right)$$

and we known R5=R1 Rc from Eq. (8), thus $$\frac{R4\,R5}{R1\,Rc} = 1 \quad (15)$$

thus, $$Vout = Rdt\,Id\left(\frac{X}{1-aK} + \frac{L-X}{1-K}\right)$$

It should be noted that the Vout is a function of the length X immersed in the liquid and is not affected by the change $\Delta T$ in the ambient temperature.

According to the present invention, since it is possible to prevent the current from the constant current source 1 from flowing through other succeeding circuits or circuit elements, the accurate measurement of the liquid level can be made.

The temperature compensating resistor Rc will not contribute to error in measuring the liquid level. This is advantageous in that the temperature compensating resistor Rc can be of the same resistance as the level detecting resistor, which is convenient in production as well as inventory supervision. The resistors Rd and Rc of the same design permits to use a resistance wire of the same lot of wire production line, which in turn allows the temperature coefficients $\alpha d$ and $\alpha c$ of the resistors to be very close to each other. Since it is not necessary to increase the resistance of the temperature compensating resistor, the temperature compensating resistor Rc can be of a small heat capacity, being advantageous in quickly responding to the rapid change of ambient temperatures.

What is claimed is:

1. A liquid level detecting apparatus comprising:
   a constant current source (1) having a first terminal (7) and a second terminal (6);
   a level detecting resistor (Rd) inserted into a liquid and having a first terminal connected to the first terminal (7) of said constant current source (1) and a second terminal connected to the second terminal (6) of said constant current source (1) so as to be supplied a constant current (Id), said level detecting resistor (Rd) having a first temperature coefficient ($\alpha d$) and having a length (X) immersed in the liquid and having a resistance which varies in accordance with said length immersed in the liquid;
   a first amplifier (OP1) having an inverting input terminal (−), a non-inverting input terminal (+), and an output terminal, and a second amplifier (OP2) having an input and and output terminals, said second amplifier functioning as a voltage follower;
   a first resistor (R1) connected between the inverting input terminal (−) of said first amplifier (OP1) and the second terminal (6) of said constant current source (1), said first resistor having a first resistance;
   a second resistor (R2) connected between the inverting input terminal (−) and the output terminal of said first amplifier (OP1), said second resistor having a second resistance;
   a third resistor (R3) connected between the non-inverting input terminal (+) of said first amplifier (OP1) and the first terminal of said level detecting resistor (Rd), said third resistor having a third resistance equal to the first resistance of said first resistor (R1);
   a temperature compensating resistor (Rc) connected between the output terminal of said first amplifier (OP1) and the input terminal of said second amplifier (OP2), said temperature compensating resistor (Rc) having a resistance (Rc) at a predetermined ambient temperature (t) and a second temperature coefficient ($\alpha c$) equal to the first temperature coefficient ($\alpha d$) of said level detecting resistor (Rd);
   a fourth resistor (R4) connected between the non-inverting input terminal of said first amplifier (OP1) and the output terminal of said second amplifier (OP2), said fourth resistor (R4) having a fourth resistance equal to the second resistance of said second resistor (R2);
   a fifth resistor (R5) connected between the input terminal of said second amplifier (OP2) and the second terminal (6) of said constant current source (1), said fifth resistor having a fifth resistance; wherein
   a ratio (R1/R2) of said first resistance to said second resistor (R2) is equal to a ratio (R5/Rc) of said fifth resistance to the resistance of said temperature compensating resistor (Rc), and a voltage at the output terminal of said second amplifier (OP2) indicates a level of the liquid.

2. A liquid level detecting apparatus according to claim 1, wherein said first and second amplifier includes OP amplifiers.

3. A liquid level detecting apparatus according to claim 1, wherein said level detecting resistor and temperature compensating resistor are made of wire wound resistors.

* * * * *